Oct. 25, 1955   B. L. HOLM   2,721,998
RADAR REFLECTOR
Filed April 13, 1951
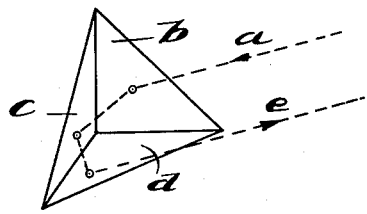
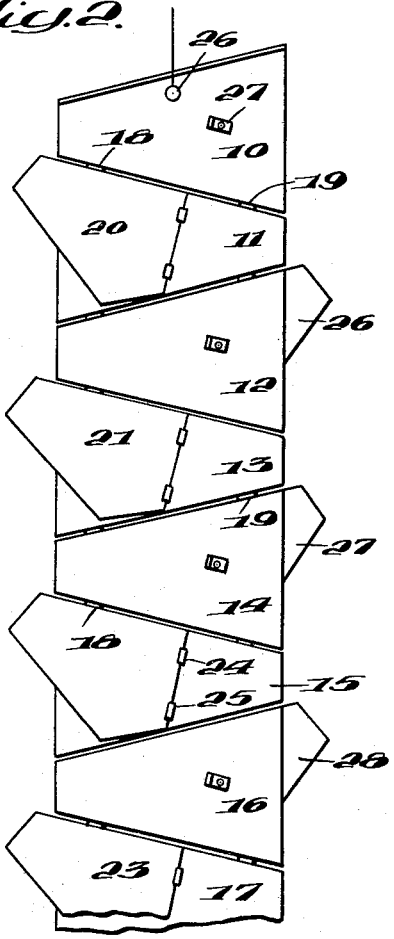
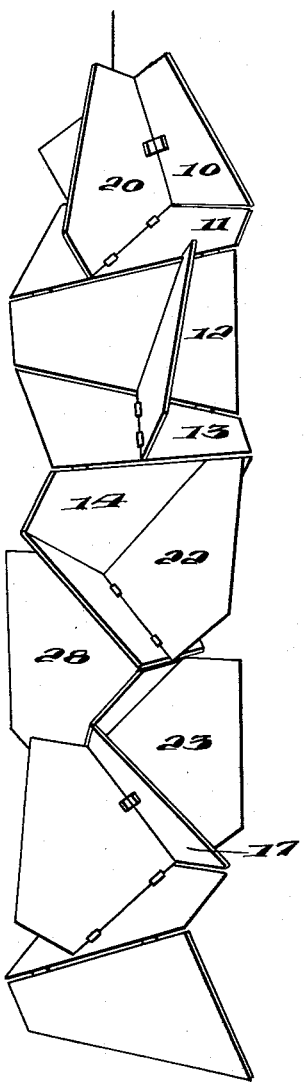
INVENTOR
BENGT LENNART HOLM,
BY
ATTORNEYS

United States Patent Office 2,721,998
Patented Oct. 25, 1955

2,721,998

RADAR REFLECTOR

Bengt L. Holm, Stockholm, Sweden, assignor to Svenska Aktiebolaget Gasaccumulator, Lidingo, Sweden, a corporation of Sweden Application April 13, 1951, Serial No. 220,753

6 Claims. (Cl. 343—18)

The present invention relates to radar reflectors. According to the principle of radar, a pulsed signal of a very high frequency is transmitted into the adjacent space, preferably by means of a rotating movement scanning said space and certain targets reflect frequency back to the transmitter place. Simultaneously, a beam in a cathode ray tube is directed on to the screen of said tube with a sweep movement synchronized with the scanning movement. The cathode ray is influenced by the reflected radar wave as far as regards its intensity. This influence, for instance, may be of such a kind that the cathode ray is fully or partly suppressed when no reflected beam is received, but will obtain full intensity when a reflected beam is received. The cathode ray valve then will indicate on its screen the position of the objects, the topographical formations or the like, causing the reflection of the input radar beam.

For the purpose of obtaining improved reflection of the radar pulses from objects of different kinds, one has proposed to use specific reflector devices called artificial radar reflectors, which are mounted on the land formations or the objects. In order to be as useful as possible, such a radar reflector should reflect the input radar pulses in their initial direction, that is, the direction on to the antenna of the radar apparatus, with a minimum of losses.

It is an object of this invention to improve the reflecting characteristics of such artificial reflectors.

The artificial radar reflectors hitherto used have, as a rule, been composed by plane, electrically conducting surfaces made, for instance, of sheet metal. Such a surface reflects the pulses from a radar transmitter, as well as radio waves, provided that the dimensions of the surface are greater, preferably many times greater than the wave length used—in the same way a plane mirror reflects the waves of light. Such a plane reflector surface may not suitably be used alone as a radar reflector because it will reflect the input wave back in its own direction only when this wave was accidentally received in a direction perpendicular to the surface of the sheet itself.

A reflector may be formed by mounting two (or three) sheets of metal perpendicular to each other, thus utilizing the properties of reflection of radio beams which are known from the light reflection in the total trihedral angle reflectors.

Three reflector screens of preferably metallic material are built together as sides of a pyramid with angles so dimensioned that an input signal wave will always be reflected back in its own input direction. This will usually take place after the signal wave has been reflected against each of the three sides, but if the input direction of the signal wave should accidentally be parallel to one of the sides, the reflection will take place only against two of the sides.

Reflectors of this kind have the disadvantage that they are rather difficult to observe in some distance, because if they should not be too bulky and unhandy, they will easily give such a weak picture on the radar screen of the receiver that they cannot be observed. Further, if one prefers that the reflector should have an even reflection in all directions, this will soon be rather complicated and expensive as far as its construction is concerned.

There are also other problems in this connection. For example, a floating sea mark, marked by radar reflectors, should retransmit in all directions. For some specific purposes, for instance, for marking distressed life boats in open sea or the like, radar reflectors are desired which take little space in collapsed state, but which may be folded out, possibly be hoisted up into a mast or the like, and thereby have a large reflecting surface in order that they should, in the clearest possible way, mark the position of the life boat.

The present invention refers to a radar reflector which satisfied a combination of these requirements.

Reference is now made to the accompanying drawings in which:

Fig. 1 is a diagrammatic representation of the principle for a total reflecting pyramid;

Fig. 2 is a perspective side elevation of a reflector made in accordance with the present invention with the parts disposed in flattened inoperative position, and Fig. 3 is a similar view showing the invention with the parts in unfolded operative position.

Fig. 1 gives the principle for the total reflecting pyramid. As indicated above, three reflector screens preferably of metallic material are, in this reflector, built together as sides of a pyramid with angles so dimensioned that an input signal wave will always be reflected back in its own input direction. This will usually take place after the signal wave has been reflected against each of the three sides, but if the input direction of the signal wave should accidentally be parallel to one of the sides, the reflection would take place only against two of the sides. Thus, for instance, the beam $a$ in Fig. 1 is first reflected on to the side $b$, thereafter on to the side $c$, and finally on to the side $d$, said beam thereafter turning back in its own initial direction as the beam $e$.

With regard to the present invention, this is illustrated in Figs. 2 and 3 of the drawing.

The reflector is built on the principle of the total reflecting pyramid being composed by a great number of pyramids, so arranged that together they form one or more spiral paths about a common axis.

This is achieved by dividing a strip of plate, Fig. 2, in a number of segments of the nature of a four-cornered figure, for instance, a trapezoidic figure, so that the edges of said segments, which are parallel or perpendicular to each other, form the edges of the strip of plate. Some such segments are, for instance, indicated at 10—17, the edges of the strip of plate in the preferred embodiment having been shown as parallel. The segments are joined, for instance, by means of hinge-like joints 18, 19, so that the bending of the segments will thereby take place alternatively in one direction and in the other. A cross part 20—23 is connected to every second one of these trapezoidic segments. In a simple form of execution, the cross elements may be rigidly connected perpendicular to the trapezoidic segment to which they are fixed, but in the preferred form of execution of the invention, shown in Fig. 2, they are connected by means of hinge-like joints 24, 25, which may be spring biased. In the arrangement shown in the drawing according to Fig. 2, the elements 20—23 are placed flatly on the trapezoidic segment 11, 13, 15 and 17, to which they are fixed, but they may, by means of the hinges 24, 25, be bent up so that they stand perpendicularly to the trapezoidic segments.

In a specially preferred embodiment of the invention, the hinges 18, 19 are of such a kind that they do not allow a greater movement between the segments connected to each other than from the position in which the segments, for instance, the two segments 10 and 11, are lying flatly on each other, to a position in which they stand perpendicularly to each other. One may then, by moving the joint line of the segments 17 and 16 backwards from the plane of the drawing, the joint line of the segments 16 and 15 forwards, the joint line of the segments 14 and 15 backwards, and so on, fold the reflector together so that it will take up very small space. If the reflector is thereafter elevated by the hole 26 or in a wire connected thereto, it will unfold itself, but as all of the hinges 18, 19 are of such a kind that they do not allow for a greater movement than 90°, the different trapezoidic levels of the reflector will remain in mutually perpendicular angle.

Further, the hinges 24 and 25 are preferably spring biased so that the elements 20—23 automatically snap up as soon as the reflector is fully unfolded. Also, their movement should, however, be stopped when it has got 90° magnitude, for instance, by means of a stop 27.

Elements corresponding to the elements 26—28, 20—23, as well as hinges corresponding to the hinges 24 and 25 and stops corresponding to the stops 27, have also been mounted on the back sides of the segments 10, 12, 14, 16, which do not carry elements 20—23 on their front sides. The reflector will then in its unfolded state look like the one shown in Fig. 3. It is immediately evident from this figure that the reflector will be formed by a great number of pyramidic or trihedral angle total reflectors connected together, said reflectors further being arranged in such a way in relation to each other that the space bisectrices of their points will be divided along four spiral surfaces about the longitudinal axis of the reflectors. The space bisectrice is a line formed by the intersection of the three planes which bisect the three angles of the trihedral angle.

It is evident from the above that a reflector according to the present invention will, due to the extremely even division of the reflex axes of the total reflecting pyramids, retransmit the radar beam with substantially equal intensity in all directions.

The reflector according to the invention cannot only be made with a circumference which may be drawn inside a cylinder, but it may be given a more suitable form, for instance, a form which can be mounted inside a cone or some other geometric figure.

If the reflector is further collapsible in the above-mentioned manner, it will be very easy to handle. It may be collapsed into a small package of plates lying evenly on each other which is easy to transport and will need little space. It can be brought automatically to unfold itself in correct position simply by hoisting it up from one end, for instance, in a mast-head, and it is very easy to refold if it should, for one reason or another, be demounted therefrom.

Finally, it should be mentioned that very simple methods may be used when manufacturing the reflector and that practically no material is lost in cutting the different sheet elements out, because they may easily be cut, with simple and cheap tools, out of a strip of plate of constant width or otherwise suitable form. The production of the reflector is, therefore, cheap. An additional feature in this respect is that both sides of each present piece of plate are effectively participating in the reflecting function with the only exception of the uppermost and lowermost plates.

What is claimed is:

1. A radar reflector, comprising a group of trihedral angle reflectors, each having three side surfaces, said reflectors having their vertices along a helical line passing about the longitudinal axis of the radar reflector, and grouped along this line with their space bisectrices approximately perpendicular to said axis.

2. A radar reflector according to claim 1, two of the side surfaces making up each trihedral angle reflector of the total reflector being disposed in the form of a continuous tape bent along lines which form such an angle with each other that each side surface will obtain the form of a suitably parallel trapezoidic surface, two sides of which coincide with the edges of the tape, whereas the third side surface is provided by means of a separate plate disposed perpendicularly to the two first mentioned side surfaces so that two trihedral angle reflectors are contained between the three plates respectively.

3. A radar reflector, comprising a group of trihedral angle reflectors, said reflectors having their vertices along a helical line passing about the longitudinal axis of the radar reflector and grouped along this line with their space bisectrices approximately perpendicular to said axes, two of the side surfaces making up each trihedral angle reflector of the group being disposed to form a continuous tape bent along lines which form such an angle with each other that each side surface will obtain the form of a suitably parallel trapezoidic surface, two sides of which coincide with the edges of the tape, whereas the third side surface is provided by means of a separate plate disposed perpendicularly to the two first mentioned side surfaces so that two trihedral angle reflectors are contained between the three plates respectively, the bending lines along the tape being every second time directed in one direction and every second time directed in another direction, so that the reflector surfaces formed between them are turned alternatively in different directions, hinge means provided between the different parallel trapezoidic parts to effect the bending of the tape, said hinges being formed so that they do not normally allow for a greater movement between adjacent parallel trapezoidic plates than from lying flatly on each other to standing perpendicularly to each other.

4. A radar reflector in accordance with claim 3, and hinges joining the separate plates forming the third side of each trihedral reflector of the group with a corresponding parallel trapezoidic plate.

5. A radar reflector in accordance with claim 3, spring loaded hinges joining the separate plates forming the third side of each trihedral reflector of the group with a corresponding parallel trapezoid plate, whereby the plates forming said third sides will snap into position perpendicular to the other two sides as soon as the last two mentioned sides have reached their mutually perpendicular position.

6. A radar reflector in accordance with claim 3, spring loaded hinges joining the separate plates forming the third side of each trihedral reflector of the group with a corresponding parallel trapezoid plate, whereby the plates forming said third sides will snap into position perpendicular to the other two sides as soon as the last two mentioned sides have reached their mutually perpendicular position, and a stop device for preventing said third sides in their snapping movement from passing the perpendicular position in relation to the two other sides.

References Cited in the file of this patent

UNITED STATES PATENTS 2,498,660     Dunmore _____ Feb. 28, 1950

FOREIGN PATENTS 586,904     Great Britain _____ Apr. 3, 1947